UNITED STATES PATENT OFFICE.

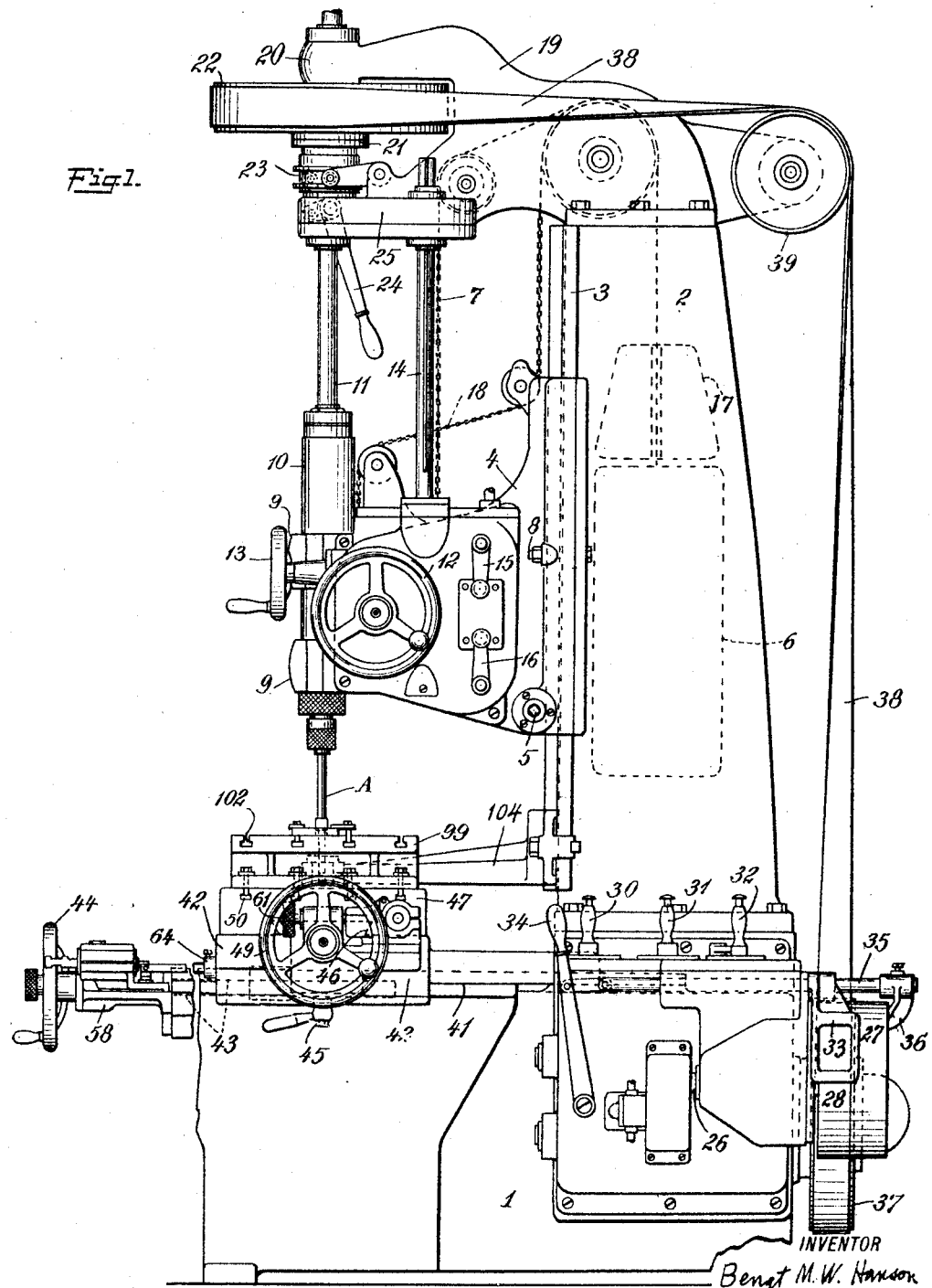

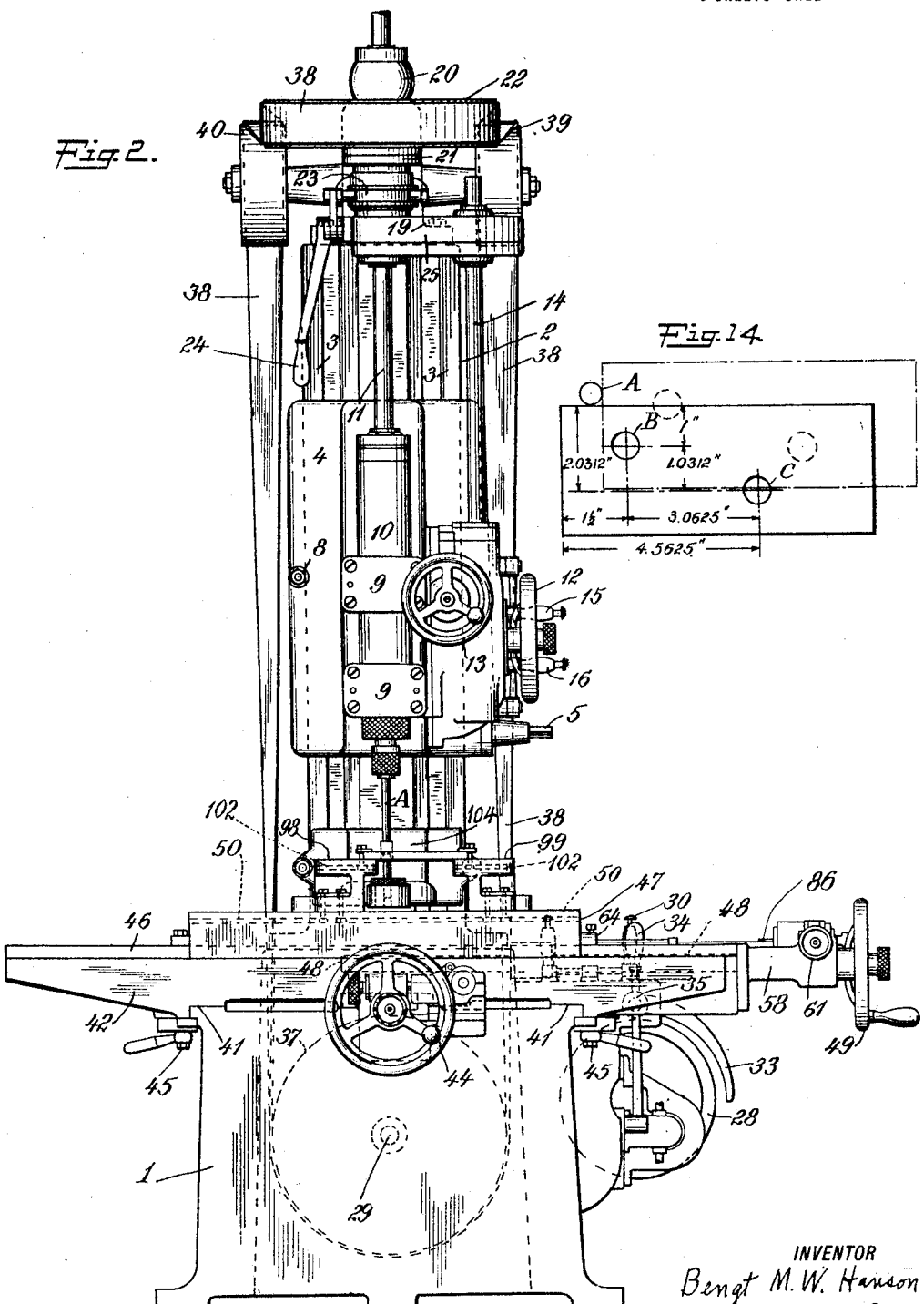

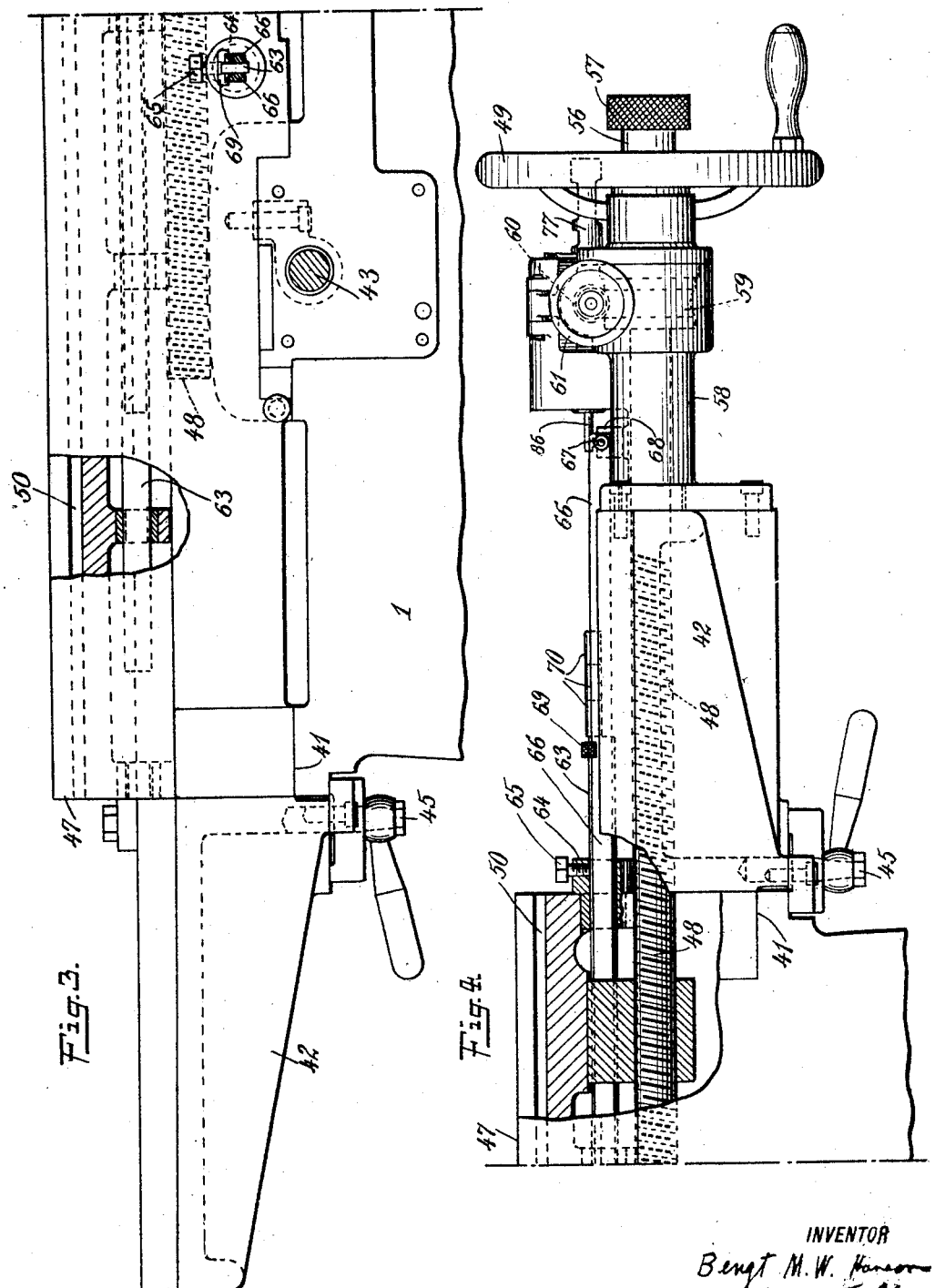

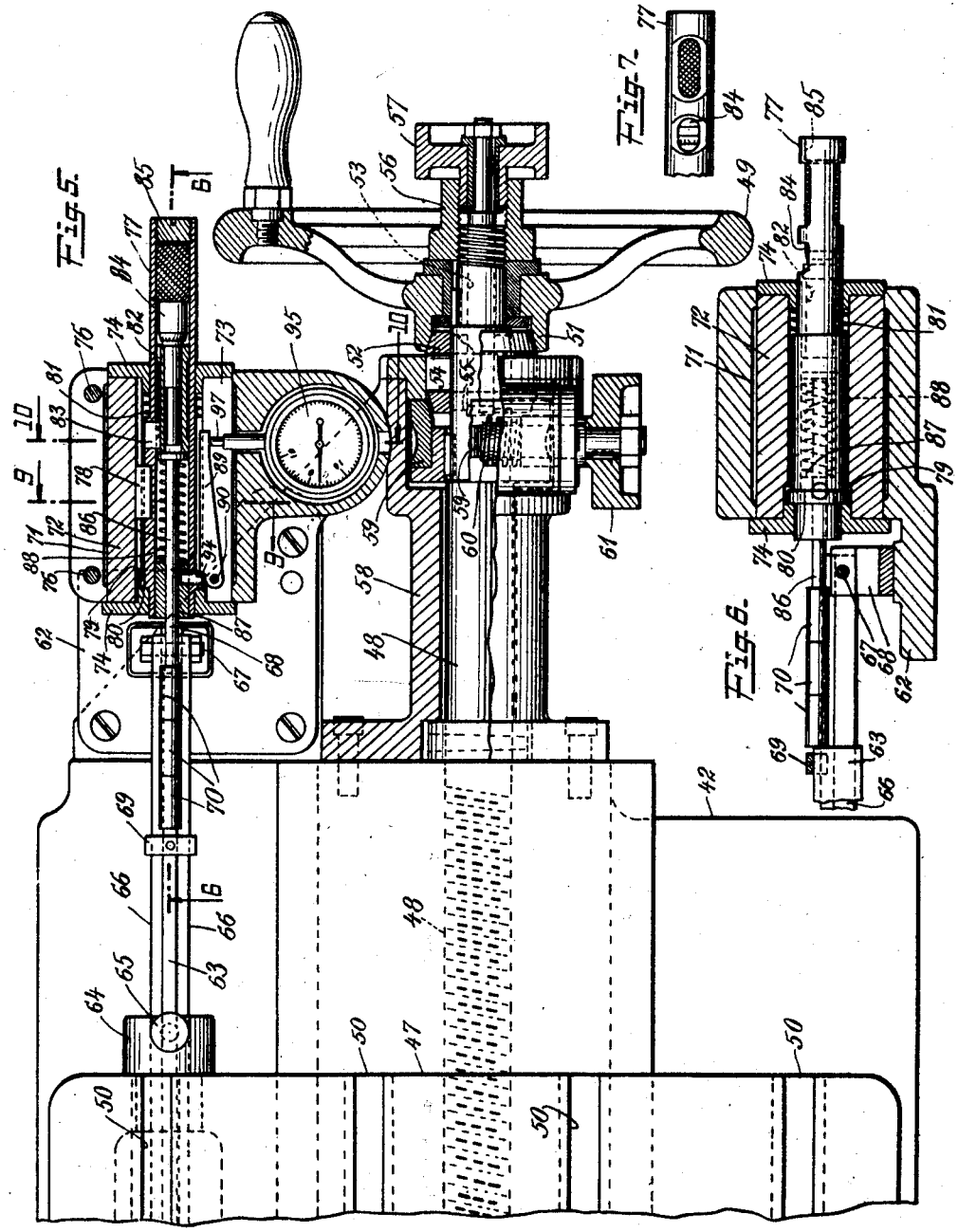

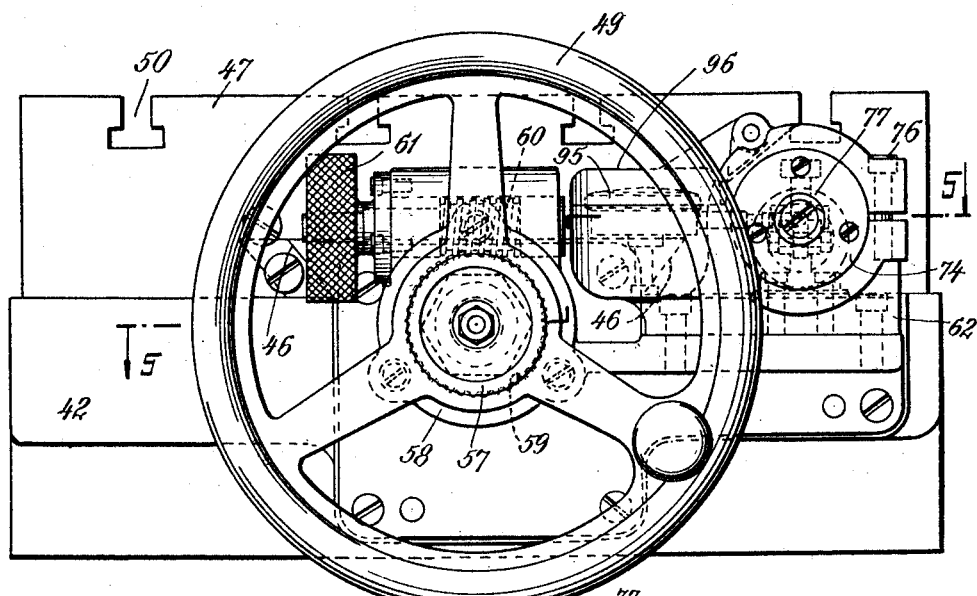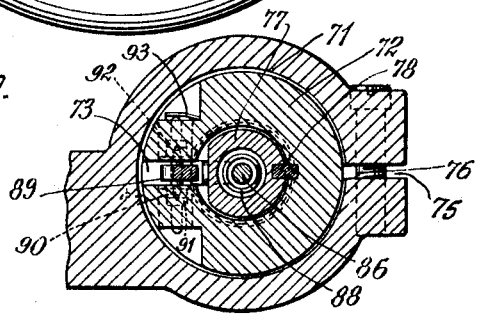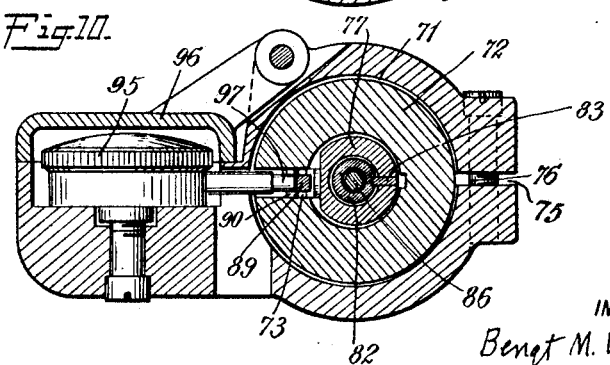

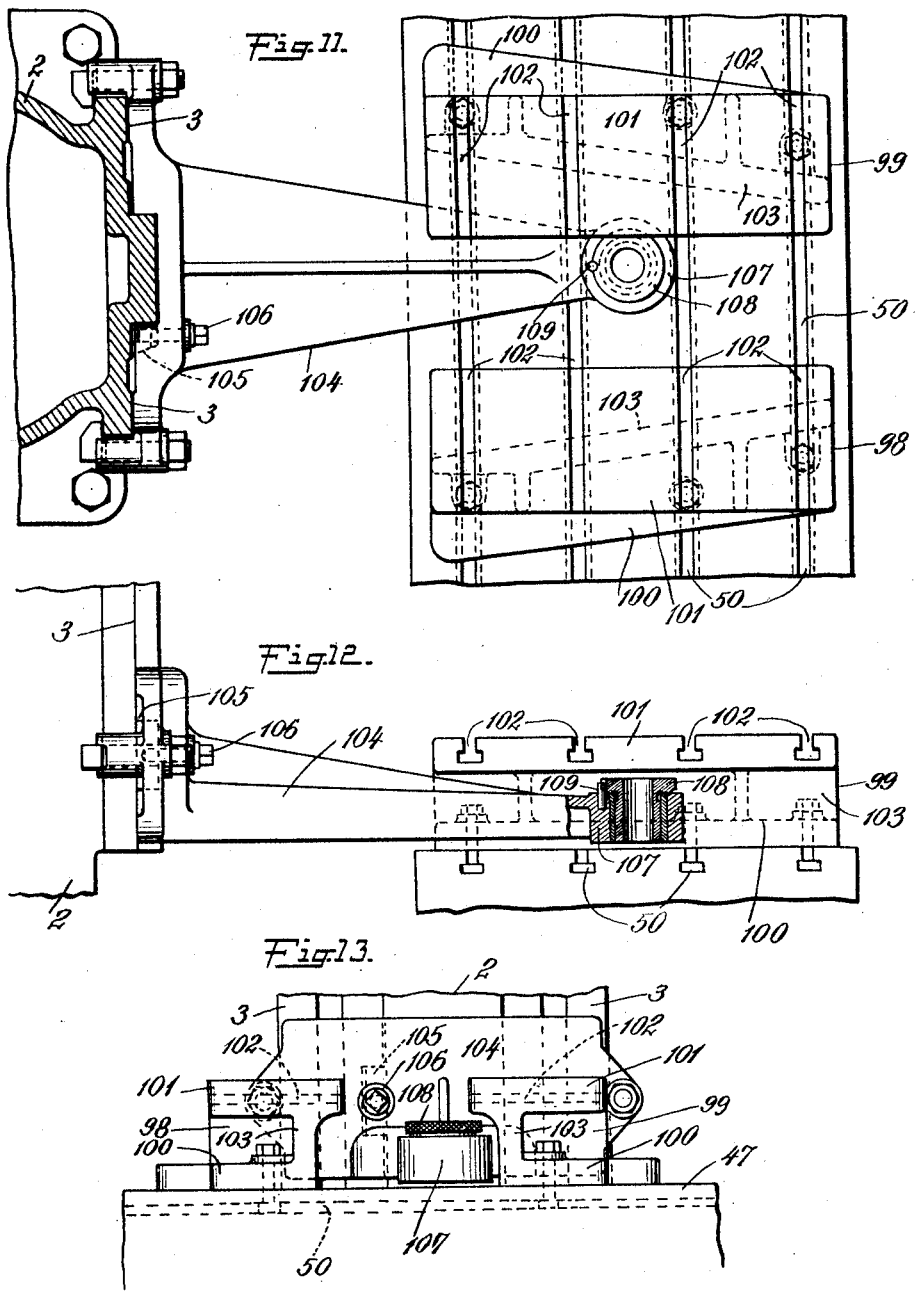

BENGT M. W. HANSON, OF HARTFORD, CONNECTICUT, ASSIGNOR TO PRATT & WHITNEY COMPANY, OF NEW YORK, N. Y., A CORPORATION OF NEW JERSEY.

PRECISION BORING-MACHINE.

1,323,267.   Specification of Letters Patent.   Patented Dec. 2, 1919.

Application filed July 9, 1917. Serial No. 179,412.

*To all whom it may concern:*

Be it known that I, BENGT M. W. HANSON, a citizen of the United States, residing at Hartford, in the county of Hartford and State of Connecticut, have invented certain new and useful Improvements in Precision Boring-Machines, of which the following is a specification.

A machine embodying the invention is particularly adapted for accurately locating and boring holes and is primarily intended for use in making jigs. The construction of the machine is such that the holes may be located within the limits of accuracy attainable with commercial measuring instruments without requiring the tedious processes and the high degree of skill usually associated with such work.

The machine comprises an axially fixed boring spindle which is preferably vertical and a work-carrying mechanism comprising a carriage and a table which are movable at right angles to each other under the control of suitable traversing devices such as screws. Mechanisms independent of the traversing devices are provided for measuring and indicating the amounts of movements of the carriage and table respectively. One of the objects of the invention is to provide in a machine of the general character set forth improved measuring devices which are readily adjustable for a wide range of movement, which are extremely accurate and which can be easily and quickly read. Another object of the invention is to provide improved means for holding the work and for supporting and guiding the boring bar. Other objects of the invention will be apparent from the following specification and claims.

In the drawings I have shown the embodiment of the invention which I now deem preferable, but it will be understood that the drawings are intended to be merely illustrative and are not to be construed as defining or limiting the scope of the invention, the appended claims being relied upon for that purpose.

Of the drawings:

Figure 1 is a side elevation of a machine embodying the invention.

Fig. 2 is a front elevation of the machine.

Fig. 3 is a fragmentary front elevation on an enlarged scale showing the left-hand side of the carriage and table upon which the work is supported and moved.

Fig. 4 is a view showing the right-hand side of the carriage and table.

Fig. 5 is a horizontal sectional view on an enlarged scale showing the devices for moving the carriage and for measuring and determining the amount of movement. The section is taken along the line 5—5 of Fig. 8.

Fig. 6 is a fragmentary vertical sectional view taken along the line 6—6 of Fig. 5.

Fig. 7 is a fragmentary plan view on the same scale as Fig. 5 showing the micrometer head and the inclosing casing therefor.

Fig. 8 is an elevational view taken from the right showing the parts appearing in Fig. 5.

Fig. 9 is a fragmentary sectional view taken along the line 9—9 of Fig. 5.

Fig. 10 is a fragmentary sectional view taken along the line 10—10 of Fig. 5.

Fig. 11 is a fragmentary plan view partly in section showing in detail some of the devices for holding the work and for supporting the boring bar.

Fig. 12 is a fragmentary elevational and sectional view showing some of the parts appearing in Fig. 11.

Fig. 13 is a fragmentary elevational view taken from the right and showing the parts appearing in Fig. 11.

Fig. 14 is a diagrammatic view which will be referred to in describing the operation of the machine.

Referring to the drawings, 1 represents the main base upon which the other parts of the machine are mounted. Extending upward from the rear part of the base is a hollow column 2 which supports the spindle and the operating and controlling parts therefor.

The column 2 is provided at 3 with suitable guideways and a head 4 slidably engages these guideways so as to be capable of movement upward or downward. Suitable means are provided for moving the head upward or downward, which means may consist of a rack carried by the column and a pinion carried by the head. These parts are not illustrated, but at 5 there is shown a squared shaft by means of which the pinion may be turned. Preferably a counterweight 6 is provided for the head, being connected therewith by means of a chain 7. After adjustment the head can be clamped in adjusted position by any suitable means such as the bolts 8.

Slidably mounted in suitable bearings 9 on the head is a sleeve within which is rotatably mounted a spindle 11. The sleeve 10 when moved vertically in its bearings carries the spindle 11 with it. Suitable means are provided for moving the sleeve, which means may be understood to comprise a rack carried by the sleeve and a rotatable pinion carried by the head, these parts, however, not being shown. For turning the pinion any usual or preferred mechanism may be provided, and this mechanism is not shown in detail as it of itself constitutes no part of the invention. It may be pointed out, however, that this mechanism preferably comprises a hand wheel 12 by means of which the pinion can be turned for a rapid movement of the spindle and a hand wheel 13 by means of which the pinion may be turned slowly for hand feeding. Preferably means are also provided for power feeding, power being received through a rotatable shaft 14 and transmitted to the pinion by means of change-speed gearing controlled by levers 15 and 16. Preferably the sleeve and the spindle are provided with a counterbalance 17 which is connected by means of a chain 18.

Secured to the top of the column 2 is a bracket 19 provided with bearings 20 and 21 in which the spindle rotates. Rotatably mounted on the spindle between the two bearings is a belt pulley 22, and a friction clutch 23 having a controlling lever 24 is provided whereby the pulley 22 may be connected to or disconnected from the spindle. The spindle has a splined engagement with the clutch, thus permitting the spindle to be moved vertically without interfering with the power connection.

The bracket 19 also carries a gear box 25 in which is positioned suitable gearing for transmitting power from the spindle to the aforesaid shaft 14. The last said shaft has a splined engagement with the gearing in the box, thus permitting the vertical movement of the shaft with the head 4 without interfering with the power connection.

Carried by a horizontal drive shaft 26 mounted on the base 1 are tight and loose drive pulleys 27 and 28. From the drive shaft 26 power is transmitted through suitable change-speed gearing to a second shaft 29. This gearing is not shown but it may be of any usual or preferred type and may be controlled by levers 30, 31 and 32. For starting and stopping the machine there is provided a belt shifter 33 adapted to move a belt from the loose pulley 28 to the tight pulley 27 or vice versa. This belt shifter is controlled by a hand lever 34 which is connected with a horizontal movable rod 35. As shown, this rod 35 carries a brake shoe 36 which can be moved into engagement with the tight pulley 27 to brake the machine. Preferably a suitable interlocking mechanism is provided which prevents the shifting of the levers 30, 31 and 32 except when the belt shifter is in its left-hand position as shown in Fig. 2. At the back of the machine there is a belt pulley 37 mounted on the aforesaid shaft 29. A belt 38 passes over the pulley 37 and also over the aforesaid pulley 22 on the spindle 11. This belt is guided over suitable idler pulleys 39 and 40.

From the foregoing description it will be clear that the spindle may be started and stopped as desired and may be rotated at any one of a plurality of speeds. The spindle is rotatable about a fixed axis and a drill or a boring bar such as indicated by A in Figs. 1 and 2 may be connected to it in the usual way. In attaining the extreme accuracy which is necessary I find it highly preferable to use a vertical spindle such as described. If a horizontal spindle were provided errors would arise from the deflection of the spindle because of its own weight and from the uneven wear of the spindle bearings.

The bed 1 is provided with suitable ways 41 upon which is mounted a carriage 42 adapted to move forward or backward as required. The movement of the carriage is effected by means of a traversing device such as a screw 43 provided with a hand wheel 44. After movement the carriage can be clamped by means of bolts 45. The carriage 42 is provided with guideways 46 at right angles to the ways 41. Movable along the guideways 46 is a work-carrying table 47 and for moving the table there is provided a traversing device such as a screw 48 having a hand wheel 49. The table is provided with T-slots 50 by means of which work to be drilled or bored may be clamped in place.

From the foregoing description it will be clear that inasmuch as the axis of the spindle 11 and of the drill or boring bar is fixed, the relative positions of the holes to be drilled or bored in the work are determined by moving the carriage 42 and the table 47 through the proper distances. One of the important features of my invention consists of mechanisms for moving the carriage and the table by means of the screws 43 and 48 and for accurately determining and measuring the extents of movements.

Mechanisms in all respects alike are provided for turning the respective screws 43 and 48; and other mechanisms in all respects alike are provided for respectively determining and measuring the positions and movements of the carriage with repect to the bed and of the table with respect to the carriage. It will be sufficient to describe in detail but one set of these mechanisms and I will describe those associated with the table 47, it being understood that those associated with the carriage 42 are exactly the same.

The hand wheel 49 is not connected directly to the screw or shaft 48 but is so mounted as to be capable of rotation independently thereof. The hub of the wheel is provided with a flange 51 having a conical bore, and mounted on the shaft 48 is a sleeve or collar 52 having a conical surface adapted to engage the conical surface of the flange. A rod 53 is movable longitudinally in a central aperture in the shaft and is connected with the collar 52 by means of a transverse pin or key 54. This key extends through a slot 55 in the shaft which is long enough to permit free movement of the key. At the end of the shaft 48 is a collar 56 having threaded engagement with the hub of a knob 57 which is connected with the rod 53. By turning the knob the rod can be moved longitudinally to bring the collar 52 into or out of engagement with the hand wheel and thus connect the hand wheel with the shaft or disconnect it therefrom.

A hollow bracket 58 is secured to the carriage 42 in position to surround or inclose the shaft 48. Positioned within the bracket 58 and loosely mounted on the shaft is a worm wheel 59 which meshes with a worm 60. The worm is rotatably mounted in the bracket and there is provided a knob 61 by means of which the worm may be turned. The worm wheel 59 is provided with a conical surface which is adapted to be engaged by a second conical surface on the aforesaid collar 52. As already described, the collar 52 when moved toward the right connects the hand wheel 49 with the shaft; but when the collar is moved toward the left it not only disengages the hand wheel but also connects the worm wheel with the shaft, whereby the shaft may be turned by means of the knob 61 acting through the worm 60. It will thus be clear that for rapid traverse of the carriage the screw 48 may be turned by means of the hand wheel and that for a very slow or minute movement the screw may be turned by means of the knob 61. When the collar 52 is in an intermediate position the hand wheel and the worm wheel are both disconnected from the shaft and any accidental or inadvertent movement thereof is prevented.

Connected to the carriage 42 is a bracket 62 upon which is mounted the mechanism for determining and measuring the movement of the table. Adapted to coöperate with the measuring mechanism is a measuring rod 63. This is slidably mounted in a bearing bushing 64 carried by the table. The rod is of sufficient length to permit its adjustment into direct coöperative relationship with the measuring mechanism with the table in either extreme or any intermediate position. After adjustment the rod can be clamped in place by means of a set screw 65. For supporting the rod there is provided a suitable means fixed against movement with the table. Preferably this means comprises two parallel horizontal rails 66, 66 which also extend through the bushing 64 at opposite sides of the rod. The corresponding rails for the carriage are shown in section in Fig. 3 and it will be observed that the tops of the rails are preferably beveled oppositely to present a trough. The rails are held against longitudinal movement by means of a bolt 67 which extends through a lug 68 secured to the bracket 62. The rails are preferably a little narrower than the rod, and the rod is provided with a cross piece 69 which rests on the rails and which serves as a handle whereby the rod may be readily moved. As already stated, the rails 66, 66 are beveled to form a trough and this trough is adapted to receive one or more end measures such as indicated by 70.

The bracket 62 is enlarged and recessed to provide a cylindrical chamber 71 having its axis in exact alinement with the axis of the end measures 70. Positioned in the chamber 71 is a bushing 72 which is slotted at 73 for a purpose to be presently set forth. Fitted to the ends of the bushing 72 are shouldered washers 74, 74. The bracket 62 is slotted along one side of the bushing 72 as indicated at 75 and clamping screws 76 are provided whereby the bushing 72 may be rigidly secured in place. It will be noted that the shoulders of the washers 74, 74 prevent the bushing from being contacted because of the slot 73. Preferably, in order to prevent any possible contraction of the bushing at the center where it is not directly supported by the washers, the walls of the chamber 71 are cut away as indicated so as to provide contact with the bushing only at the ends thereof.

Slidably mounted in the central apertures of the washers 74, 74 is an elongated sleeve or casing 77. This is held against rotative movement by means of a key 78 engaging a longitudinal keyway in the bushing 72. As shown most clearly in Fig. 6, the bushing 72 is provided with a shoulder 79 which coöperates with a flange 80 on the casing 77 to limit the longitudinal movement of the casing. The actual amount of movement permitted is very small and is greatly exaggerated in Fig. 6 in order that it may clearly appear. In practice it is preferably exactly $\frac{1}{100}$ of an inch. The casing 77 is normally held in its forward or left-hand position by means of a coil spring 81.

Slidably mounted in the casing 77 is a tube 82 which is held against rotative movement by means of a key 83 fitting a longitudinal keyway in the tube, as shown in Fig. 5. The tube 82 is fitted to the body of a micrometer head 84. This micrometer head is, or at least may be, of standard commercial construction and it will not be necessary to here describe it in detail. The casing 77 is cut away as indicated in Figs. 4 and 7 to permit the micrometer barrel to be turned and to enable the micrometer readings to be observed. The casing 77 is closed at its rear or right-hand end by means of a plug 85 which is engaged by the outer end of the micrometer barrel. The aforesaid tube 82 extends toward the left beyond the end of the stem of the micrometer head where it engages a flange formed on a rod or stem 86. This rod extends through the central opening of a bushing 87 mounted in the casing 77 and the rod is normally held in its extreme right-hand position with respect to the casing by means of a coil spring 88. The stem 86 is adapted to coöperate at its left-hand end with the measuring rod 63 either directly or indirectly by means of one or more of the end measures 70 and the stem together with the tube 82 in effect constitutes an extension of the micrometer head. By turning the micrometer barrel the tube 82 and the stem 86 can be moved relatively toward the left to any desired extent as indicated by the micrometer readings, it being understood that the micrometer barrel is held relatively fixed by reason of its engagement with the plug 85. The direct readings of the micrometer head represent the actual movement of the stem 86 toward the left. The micrometer head is graduated so that each division represents $\frac{1}{1000}$ of an inch.

As has been stated, the casing 77 is normally held in its left-hand position by the spring 81 which resists any movement toward the right. Thus the spring serves to cause a uniform predetermined pressure at all contact points of the measuring rod 63, of the stem 86 and of the end measures. This uniformity of pressure is of the highest importance in precision work.

When contact is effected the casing 77 is moved and the spring 81 is compressed. The exact amount of movement must be under control or at least capable of measurement in order that accurate results may be obtained. With this end in view I provide a precision device which can be used to enable the operator to secure exactly the same amount of movement or any desired amount of movement for successive adjustments and successive operations. Preferably the precision device is a dial test indicator which not only shows uniformity of movements but which will show and measure differences. The dial test indicator is separate from and supplemental to the micrometer head.

Positioned in the slot 73 of the bushing 72 is a lever 89 which is mounted on a pivot pin 90. Suitable bearings 91 and 92 are provided for the pivot pin and preferably the upper bearing 92 is pressed downward by means of a spring 93 so as to prevent any possible looseness. The lever 89 is provided at 94 with a knife edge which is adapted to contact with a hardened steel pin fitting in an aperture in the casing 77.

The bracket 62 is formed with a recess or pocket adapted to hold a dial test indicator 95 which is or may be of standard commercial form. Preferably the indicator is constructed and graduated so that each division of the dial represents $\frac{1}{1000}$ of an inch. There is a cover 96 which protects the indicator when not in use and which is pivoted so that it can be swung upward when required. The indicator 95 is so positioned that its actuating pin 97 is in engagement with the lever 89. The pin 97 contacts with the lever 89 at a point which is at a predetermined distance from the pivot 90, this distance being a definite multiple of the distance from the pivot 90 to the knife edge 94. Preferably the ratio is 10 to 1 and by reason of this ratio a movement of the pointer of the indicator over one dial division represents a movement of the casing 77 of $\frac{1}{10000}$ of an inch.

The work to be bored may be supported directly on the table 47 but in most cases it is preferable and more convenient to provide supplemental supports or parallels 98 and 99. These are shown in detail in Figs. 11, 12 and 13. It will be observed that each of them is provided with a lower horizotnal plate or flange 100 having holes through which may be passed T-bolts for securing the supporting member to the table. Each of the supporting members is also provided with a top plate or flange 101 having its top surface exactly parallel to the bottom surface of the flange or plate 100. In the top plate 101 are formed T-slots 102 which are exactly parallel to the T-slots 50 of the table when the supporting members are in place. The edges of each bottom plate 100 are inclined with respect to the sides of the corresponding top plate 101, as clearly shown in Fig. 11. Connecting the top and bottom plates of each supporting member is a vertical web 103 which is inclined in accordance with the inclination of the corresponding edge of the lower plate 100. As clearly shown in the drawings the two supporting members 98 and 99 are oppositely formed so that the two vertical webs 103, 103 are oppositely inclined to provide a space beneath the plates 101, 101 which gradually increases in width toward the rear of the machine. The work to be drilled or bored is clamped to the supporting members as shown in Figs. 1 and 2, the members being positioned a suitable distance apart. It will be observed that by means of the supplemental supporting members the work is held separated from the table so as to provide a space underneath the work into which the drill or boring tool can extend without injury to the table.

Preferably, in order to guide and support the drill or boring bar, I provide a supplemental support bracket 104 which engages the vertical ways 3, 3 on the column 2. This bracket is adjustable vertically along these ways and can be clamped in adjusted position by means of a gib 105 controlled by a screw 106. At the forward end the bracket 104 is provided with a hub 107 having a central circular aperture the axis of which is in exact alinement with the axis of the spindle 11. A plurality of bushings are provided each adapted to fit the aperture in a hub 107. These bushings have different internal diameters and one of the bushings is shown in the drawings at 108. A pin 109 is provided to prevent the bushing from turning.

When a boring bar is to be used the bracket 104 is adjusted to a position below the work, as shown in the drawings, and a bushing 108 is provided of suitable size to fit the lower end of the boring bar. In this way the boring bar is supported and guided. As clearly appears in Figs. 11 and 13 the form of the supplemental supports 98 and 99 is such that the bracket 104 may be positioned partly under the top plates 101, 101. By reason of this construction it is possible to place the supplemental supports quite close together to rigidly hold the work and at the same time considerable range of movement of the carriage and of the table is possible without any interference between the bracket 104 and the supports.

The manner of use of the machine can be best explained by setting forth the steps incidental to the drilling or boring of holes at predetermined positions in a specific piece of work such as that shown in the diagrammatic Fig. 14. It will be understood that in many cases it is necessary to first drill a hole of smaller diameter than that desired and then bore the hole to the exact size called for. The particular piece of work shown is selected merely for illustration and it will be understood that the machine is capable of use on work of a wide variety of shapes and sizes and that the manner of use will vary in accordance with the character of the work, the variations in the manner of use being obvious to those skilled in this art.

Fig. 14 shows a plate in which it is desired to bore holes at the points B and C. The plate is first loosely clamped to the supplemental supports 98 and 99 and is then adjusted into exact parallelism with the line of movement of the table 47. This is accomplished by moving the carriage longitudinally and by so adjusting the plate that by means of feelers it is ascertained to be at all points equidistant from a boring bar A secured to the spindle. The boring bar is of known diameter and will be assumed to be exactly one-half inch. When exact parallelism is obtained the work is firmly clamped in place.

Then both micrometers are set at zero. In this connection it will be remembered that each of the rods 86 constitutes an extension of the corresponding micrometer head and is held in its outermost position by means of the spring 88. It will also be remembered that each sleeve or casing 77 is initially held in its innermost position by means of the corresponding spring 81. With the end of the work in contact with the boring bar A the measuring rod 63 of the table is moved into contact with the rod 86 of the corresponding measuring mechanism, the measuring rod being moved outward sufficiently to slightly move the casing 77 outward and thus swing the lever 89 and move the indicator pointer several divisions over the dial. Then the rod 63 is clamped by means of the screw 65 and the indicator dial is turned so that the zero point of the dial lies under the pointer.

Next the carriage and the table are moved to bring the side of the work into contact with the boring bar A. Then the measuring rod 63 for the carriage is moved outward into contact with the rod 86 of the corresponding measuring mechanism, the pointer of the indicator being moved over several divisions of the dial. The measuring rod 63 is clamped in place and the indicator dial is turned to bring the zero point under the pointer.

It will be clear in order to bore the hole B that the carriage must be moved one and one-quarter inches (the distance called for by the drawing plus one-half the diameter of the boring bar) toward the rear from the position represented by the adjustment of the corresponding measuring rod 63, and that the table must be moved one and three-quarters inches (the distance called for by the drawing plus one-half the diameter of the boring bar) toward the left from the position represented by the adjustment of the corresponding measuring rod 63. The carriage is first moved toward the rear a little more than the required one and one-quarter inches. As soon as the rod 63 is disengaged from the stem 86 the pointer of the indicator will move away from the zero point under the influence of the spring 81. A one-inch measuring rod is placed on the rails 66, 66 and the micrometer head is set at .250. Then the carriage is slowly moved toward the front, use being made of the knob 61 acting through the worm 60 and the worm wheel 59. This movement is continued until the measuring rod contacts with the stem 86 and moves it sufficiently to bring the pointer of the indicator to zero. Thus the indicator serves to insure the movement of the casing and the compression of the spring to exactly the same extent as initially. The work is now positioned exactly one and one-quarter inches back of its forward position. The carriage is clamped in this position and the measuring rod is removed.

Next the table is moved a little more than one and three-quarters inches toward the left. The pointer of the corresponding indicator moves away from the zero point under the influence of the spring 81. A one-inch measuring rod is placed on the corresponding rails 66, 66 and the corresponding micrometer is set at .750. Then the table is moved slowly toward the right until the measuring rod engages the stem 86 and moves the indicator pointer to zero. Then the table is clamped in place and the measuring rod is removed.

The work is now in the correct position for drilling and boring hole B.

In a similar manner the machine may be set for boring hole C. The work must be positioned 2.2812 inches to the rear and 4.8125 inches to the left of the original or "zero" position. The carriage is first moved toward the rear and a two-inch measuring rod is put in place. The micrometer is set at .281 and then the carriage is moved forward until the indicator pointer passes the zero point and is opposite the point .0002 of the dial. In this case the indicator not only shows a movement of the casing to the same extent as initially but also a supplemental movement of .0002 inch. The sum of the readings, 2+.281+.0002 is 2.2812 which is the desired distance. The table is then moved toward the left and a four-inch measuring rod is put in place. The micrometer is set at .812. Then the table is moved toward the right until the pointer of the indicator moves past zero to the point .0005. The sum of the readings 4+.812+.0005 is 4.8125 which is the desired distance.

Instead of following the method last described for locating the second hole C, the following method is in many cases preferable. Without moving either the carriage or the table after the boring of hole B the micrometer heads are returned to zero and the rods 63 are moved to again engage the corresponding micrometer spindles and slightly compress the springs 81 and move the indicator pointers. The dials of the indicators are turned to bring the zero points under the new positions of the pointers. Thus the position of the hole B is established as the new "zero" position.

The carriage is then moved toward the rear and a one-inch measuring rod is put in place on the rails 66, 66. The micrometer is set at .031 and then the table is moved forward until the pointer of the indicator moves past zero and reaches the point .0002. The sum of the readings 1+.031+.0002 is 1.0312 which is the desired distance of the hole C in front of the hole B. The table is moved toward the left and a three-inch measuring rod is put in place on the rails 66, 66. The micrometer is set at .062 and then the carriage is moved toward the right until the pointer of the indicator moves past zero and reaches the point .0005. The sum of the readings 3+.062+.0005 is 3.0625 which is the desired distance of the hole C to the right of hole B.

It will be seen, as already pointed out, that the measuring rods, the micrometer and the dial indicator are so connected and related that in either case the desired movement is indicated by the sum of the readings of the measuring rod or rods, the micrometer head and the dial indicator. The readings may therefore be made directly without any auxiliary calculations. The even inches are measured by the measuring rods, the fractions of an inch in even thousands are read directly on the micrometer head and the ten thousandths, if any, are read directly on the dial.

What I claim is:

1. The combination in a boring machine, of a boring spindle rotatable about a fixed axis, a work table movable transversely of the spindle, manually operable means for moving the table, and mechanism independent of the table moving means for measuring the table movement, the said mechanism comprising a micrometer head and a supplemental dial indicator.

2. The combination in a boring machine, of a boring spindle rotatable about a fixed axis, a bed, a carriage movable on the bed transversely of the spindle, a work table movable on the carriage transversely of the spindle and at right angles to the direction of carriage movement, manually operable means for moving the carriage, manually operable means for moving the table, and mechanisms independent of the carriage and table moving means for measuring respectively the movement of the carriage on the bed and of the table on the carriage, the said mechanisms each comprising a micrometer head and a supplemental dial indicator.

3. The combination in a boring machine, of a boring spindle rotatable about a fixed axis, a work table manually movable transversely of the spindle, a mechanism comprising a micrometer head and a supplemental dial indicator for measuring the table movement, and means for holding end measures in coöperative relation with the measuring mechanism.

4. The combination in a boring machine, of a boring spindle rotatable about a fixed axis, a bed, a carriage movable on the bed transversely of the spindle, a work table movable on the carriage transversely of the spindle and at right angles to the direction of carriage movement, mechanisms each comprising a micrometer head and a supplemental dial indicator for measuring respectively movement of the carriage on the bed and of the table on the carriage, and means for holding end measures in coöperative relation with each measuring mechanism.

5. The combination in a boring machine, of a boring spindle rotatable about a fixed axis, a work table manually movable transversely of the spindle, and mechanism for measuring the table movement comprising a micrometer head and a supplemental dial indicator so related that the sum of their direct readings represents the total amount of movement.

6. The combination in a boring machine, of a boring spindle rotatable about a fixed axis, a work table manually movable transversely of the spindle, and mechanism for measuring the table movement comprising end measures and a micrometer head so related that the sum of their direct readings represents the total amount of movement.

7. The combination in a boring machine, of a boring spindle rotatable about a fixed axis a work table manually movable transversely of the spindle, and mechanism for measuring the table movement comprising end measures, a micrometer head and a supplemental dial indicator so related that the sum of their direct readings represents the total amount of movement.

8. The combination in a boring machine, of a boring spindle rotatable about a fixed axis, a work table manually movable transversely of the spindle, mechanism for measuring the table movement comprising end measures and a micrometer head, and yieldable means for causing a predetermined pressure between the contacting surfaces of the measuring mechanism.

9. The combination of a movable work-carrying table, a micrometer head normally relatively fixed but capable of a very limited movement with the table, a measuring element movable with the table and adapted to coöperate with the micrometer head, and a precision device associated with the micrometer head for measuring the movements thereof, thereby enabling the operator to move it to the desired extent and repeatedly to the same extent when necessary.

10. The combination of a movable work-carrying table, a micrometer head normally relatively fixed but capable of a very limited movement with the table, a measuring element movable with the table and adapted to coöperate with the micrometer head, and a precision dial indicating device associated with the micrometer head for measuring the movements thereof, thereby enabling the operator to move it to the desired extent and repeatedly to the same extent when necessary.

11. The combination of a movable work-carrying table, a micrometer head normally relatively fixed but capable of a very limited movement with the table, a measuring element movable with the table and adapted to coöperate with the micrometer head, a precision dial indicating device, and a multiplying lever interposed between the micrometer head and the indicating device whereby the indicating device serves to measure the movements of the micrometer head, thereby enabling the operator to move it to the desired extent and repeatedly to the same extent when necessary.

12. The combination of a movable work-carrying table, a micrometer head normally relatively fixed but capable of a very limited movement with the table, a measuring element movable with the table and adapted to coöperate with the micrometer head, a precision device associated with the micrometer head for measuring the movements thereof, thereby enabling the operator to move it to the desired extent and repeatedly to the same extent when necessary, and means for limiting the movements of the micrometer head to a range within the capacity of the precision device.

13. The combination of a movable work-carrying table, a micrometer head normally relatively fixed but capable of a very limited movement with the table, means for supporting one or more end measures, a measuring element movable with the table and adapted to coöperate directly with the micrometer head or indirectly therewith through the end measures, and a precision device associated with the micrometer head for measuring the movements thereof, thereby enabling the operator to move it to the desired extent and repeatedly to the same extent when necessary.

14. The combination of a movable work-carrying table, a micrometer head normally relatively fixed but capable of a very limited movement with the table, a measuring element movable with the table and adapted to coöperate with the micrometer head, means for resisting movement of the micrometer head in one direction, and a precision device associated with the micrometer head for measuring the movements thereof, thereby enabling the operator to move it to the desired extent and repeatedly to the same extent when necessary.

15. The combination of a movable work-carrying table, a micrometer head normally relatively fixed but capable of a very limited movement with the table, a measuring element movable with the table and adapted to coöperate with the micrometer head, a spring for resisting movement of the micrometer head in one direction, and a precision device associated with the micrometer head for measuring the movements thereof, thereby enabling the operator to move it to the desired extent and repeatedly to the same extent when necessary.

16. The combination of a movable work-carrying table, a micrometer head normally relatively fixed but capable of a very limited movement with the table, means for supporting one or more end measures, a measuring element movable with the table and adapted to coöperate directly with the micrometer head or indirectly therewith through the end measures, means for resisting movement of the micrometer head in one direction and for thus insuring a definite predetermined pressure on the measuring contacts, and a precision device associated with the micrometer head for measuring the movements thereof, thereby enabling the operator to move it to the desired extent and repeatedly to the same extent when necessary.

17. The combination of a movable work-carrying table, a micrometer head normally relatively fixed but capable of a very limited movement with the table, means for supporting one or more end measures, a measuring element movable with the table and adapted to coöperate directly with the micrometer head or indirectly therewith through the end measures, a spring for resisting movement of the micrometer head in one direction and for thus insuring a definite predetermined pressure on the measuring contacts, and a precision device associated with the micrometer head for measuring the movements thereof, thereby enabling the operator to move it to the desired extent and repeatedly to the same extent when necessary.

18. The combination of a movable work-carrying table, a micrometer head having its stem extending toward the table, a measuring element movable with the table and adapted to coöperate with the body of the micrometer head, and a support for the micrometer head engaging the rear end of the barrel thereof whereby the body of the micrometer head is moved toward or from the measuring element when the barrel is turned and whereby the distance corresponding to the barrel adjustment is readable directly from the graduation.

19. The combination of a movable work-carrying table, a measuring mechanism fixed against movement with the table, a longitudinal measuring rod associated with the table and adapted to directly coöperate with the measuring mechanism, a table carried bearing in which the rod is slidably adjustable in accordance with either extreme position or any intermediate position of the table, and means for locking the rod to the table after adjustment.

20. The combination of a movable work-carrying table, a measuring mechanism fixed against movement with the table, a longitudinal measuring rod associated with the table and adapted to directly coöperate with the measuring mechanism, a table carried bearing in which the rod is slidably adjustable in accordance with either extreme position or any intermediate position of the table, means for locking the rod to the table after adjustment, and means fixed against movement with the table for supporting and guiding the rod.

21. The combination of a movable work-carrying table, a measuring mechanism fixed against movement with the table, a longitudinal measuring rod associated with the table and adapted to directly coöperate with the measuring mechanism, a table carried bearing in which the rod is slidably adjustable in accordance with either extreme position or any intermediate position of the table, means for locking the rod to the table after adjustment, and means fixed against movement with the table for supporting and guiding the rod and for holding one or more end measures between the rod and the measuring mechanism.

22. The combination of a movable work-carrying table, a measuring mechanism fixed against movement with the table, a longitudinal measuring rod associated with the table and adapted to directly coöperate with the measuring mechanism, a clamping device whereby the rod may be locked to the table, a longitudinal supporting device positioned adjacent the rod and fixed against movement with the table, and a table carried bearing with which the rod and the supporting device have slidable engagement, the rod being adjustable in the bearing in accordance with either extreme position or any intermediate position of the table and the supporting device being adapted to hold one or more end measures between the rod and the measuring device.

23. The combination of a movable work-carrying table, a measuring mechanism fixed against movement with the table, two parallel longitudinal rails fixed against movement with the table, a longitudinal measuring rod positioned between and supported by the rails and adapted to directly coöperate with the measuring mechanism, a clamping device whereby the rod may be locked to the table, and a table carried bearing with which the rod and the rails have slidable engagement, the rod being adjustable in the bearing in accordance with either extreme position or any intermediate position of the table and the rails being adapted to support one or more end measures between the rod and the measuring device.

24. The combination in a boring machine, of a boring spindle rotatable about a fixed axis, a bed, a carriage movable on the bed transversely of the spindle, a work table movable on the carriage transversely of the spindle and at right angles to the direction of carriage movement, traversing screws for the carriage and table respectively, mechanisms supplemental to the screws for measuring respectively the movements of the carriage on the bed and of the table on the carriage, two independent differently speeded devices for turning each screw, and means for optionally causing either of the devices to be operative whereby the carriage or the table may be moved rapidly for preliminary adjustments or slowly for final adjustments as indicated by the corresponding measuring mechanism.

25. The combination in a boring machine, of a boring spindle rotatable about a fixed axis, a bed, a carriage movable on the bed transversely of the spindle, a work table movable on the carriage transversely of the spindle and at right angles to the direction of carriage movement, traversing screws for the carriage and table respectively, mechanisms supplemental to the screws for measuring respectively the movements of the carriage on the bed and of the table on the carriage, two independent differently speeded devices for turning each screw, and means for optionally causing either of the devices to be operative whereby the carriage or the table may be moved rapidly for preliminary adjustments or slowly for final adjustments as indicated by the corresponding measuring mechanism or for causing both devices to be inoperative whereby the screw is protected against accidental movements.

26. The combination in a boring machine, of a vertical boring spindle rotatable about a fixed axis, a bed, a carriage horizontally movable on the bed, a work table horizontally movable on the carriage at right angles to the direction of carriage movement, traversing means for the carriage and table respectively, auxiliary means for supporting work at a level above the top of the table, and a bracket carrying a bearing in alinement with the spindle for supporting the lower end of a boring bar at a point between the table and the work.

27. The combination in a boring machine, of a vertical boring spindle rotatable about a fixed axis, a bed, a carriage horizontally movable on the bed, a work table horizontally movable on the carriage at right angles to the direction of carriage movement, traversing means for the carriage and table respectively, two auxiliary work-supporting devices each comprising a bottom plate adapted to rest on the table, a top plate adapted to engage the work and a vertical connecting web, and a bracket carrying a bearing for supporting the lower end of a boring bar at a level between the levels of the said plates.

28. The combination in a boring machine, of a vertical boring spindle rotatable about a fixed axis, a bed, a carriage horizontally movable on the bed, a work table horizontally movable on the carriage at right angles to the direction of carriage movement, traversing means for the carriage and table respectively, two auxiliary work-supporting devices each comprising a bottom plate adapted to rest on the table, a top plate adapted to engage the work and a vertical connecting web, the said webs being oppositely inclined to provide between them a space which increases in width toward the rear, and a bracket extending into the said space and carrying a bearing for supporting the lower end of a boring bar at a level between the levels of the said plates.

In testimony whereof I hereto affix my signature.

BENGT M. W. HANSON.